(12) United States Patent
Skarupa et al.

(10) Patent No.: US 6,553,602 B1
(45) Date of Patent: Apr. 29, 2003

(54) DEVICE FOR PIPELINE INTERIOR CLEANING

(75) Inventors: Peter Skarupa, Senica (SK); Anton Zelenaj, Nitra (SK); Pavol Simko, Senica (SK); Peter Jaras, Cerova (SK); Pavol Kudlac, Kovalov (SK)

(73) Assignee: Slovensky Plynarensky Priemysel, S.P., Bratislava (SK)

( * ) Notice: Subject to any disclaimer, the term of this patent is extended or adjusted under 35 U.S.C. 154(b) by 0 days.

(21) Appl. No.: 09/486,909

(22) PCT Filed: Sep. 10, 1998

(86) PCT No.: PCT/SK98/00012

§ 371 (c)(1),
(2), (4) Date: May 23, 2000

(87) PCT Pub. No.: WO99/13995

PCT Pub. Date: Mar. 25, 1999

(30) Foreign Application Priority Data

Sep. 13, 1997 (SK) ............................................. 1250-97

(51) Int. Cl.$^7$ ................................................. B08B 9/04
(52) U.S. Cl. ................................................. 15/104.061
(58) Field of Search ............................... 15/104.061, 3.5

(56) References Cited

U.S. PATENT DOCUMENTS

| 4,027,349 A | 6/1977 | Clavin |
| 4,345,350 A | 8/1982 | Burd |

FOREIGN PATENT DOCUMENTS

| DE | 0 076 434 | 9/1982 |
| RU | 2010631 C1 | 4/1994 |
| SK | 530-95 | 11/1996 |
| SU | 1227267 A1 | 5/1984 |
| SU | 1600864 | * 10/1990 |
| WO | WO 97/17566 | 5/1997 |

OTHER PUBLICATIONS

Viliam Hrnčiar, *Vlastnosti A Aplikácia Nových Magneticky Tvrdých Materiálov* Technológia '91, Bratislava, Sep. 117, 1991, pp. 158–159.

D. Hrivňáková et al., *Vlastnosi vysokových permanentných magnetov a ich využitie* II. Technický seminár IDEE 96, Trenčín, Oct. 3–4, 1996.

V. Hrnčiar, *Použiltie Permanentných Maggnetov NaZberač Feromagnetických Nečistôy Pre Čistenie Portrubia Plynovodu* Co–Mat–Tech 97, Trnava, Oct. 14–15, 1997.

R.J. Parker, *Survey of Rare Earth Permanent Magnet Applications* IEEE Transactions on Magnetics, vol. MAG–17, No. 6, Nov. 1981, pp. 2985–2987.

Fathi Ahmed Heraiba et al., *Pipeline Pigging for Deposit Removal* Pipeline Rehabilitation & Maintenance Conference Proceedings, May 3–6, 1997, pp. 1–6.

Viliam Hrnčiar, *Prehl'ad Súčasného Stavu, Vlastností a Využitia Permanentných Magnetov Na Bázr Zliatin Kovov Vzácnych Zemín* Magneticky Tvrdé Materiály Bratislava, Sep. 19, 1990.

Alasdair Clyne, *Rehabilitation of the Bulgarian Natural Gas Transmission Pipeline System*.

* cited by examiner

*Primary Examiner*—Randall E. Chin
(74) *Attorney, Agent, or Firm*—Michael, Best & Friedrich, LLC

(57) ABSTRACT

The present invention relates to a pipeline interior surface cleaning device that is propelled through the pipeline by the operational properties of the transported medium. A speed regulator controls the rate of forward motion of the device and a series of off-axis wheels enables the device to travel in a spiraling motion through the pipeline. A series of sealing members, scraping elements, brushes and magnets loosen and collect particles on the interior pipeline surface as the cleaning device spirals through the pipeline.

18 Claims, 1 Drawing Sheet

DEVICE FOR PIPELINE INTERIOR CLEANING

BACKGROUND OF THE INVENTION

1. Field of the Invention

Figure 1:
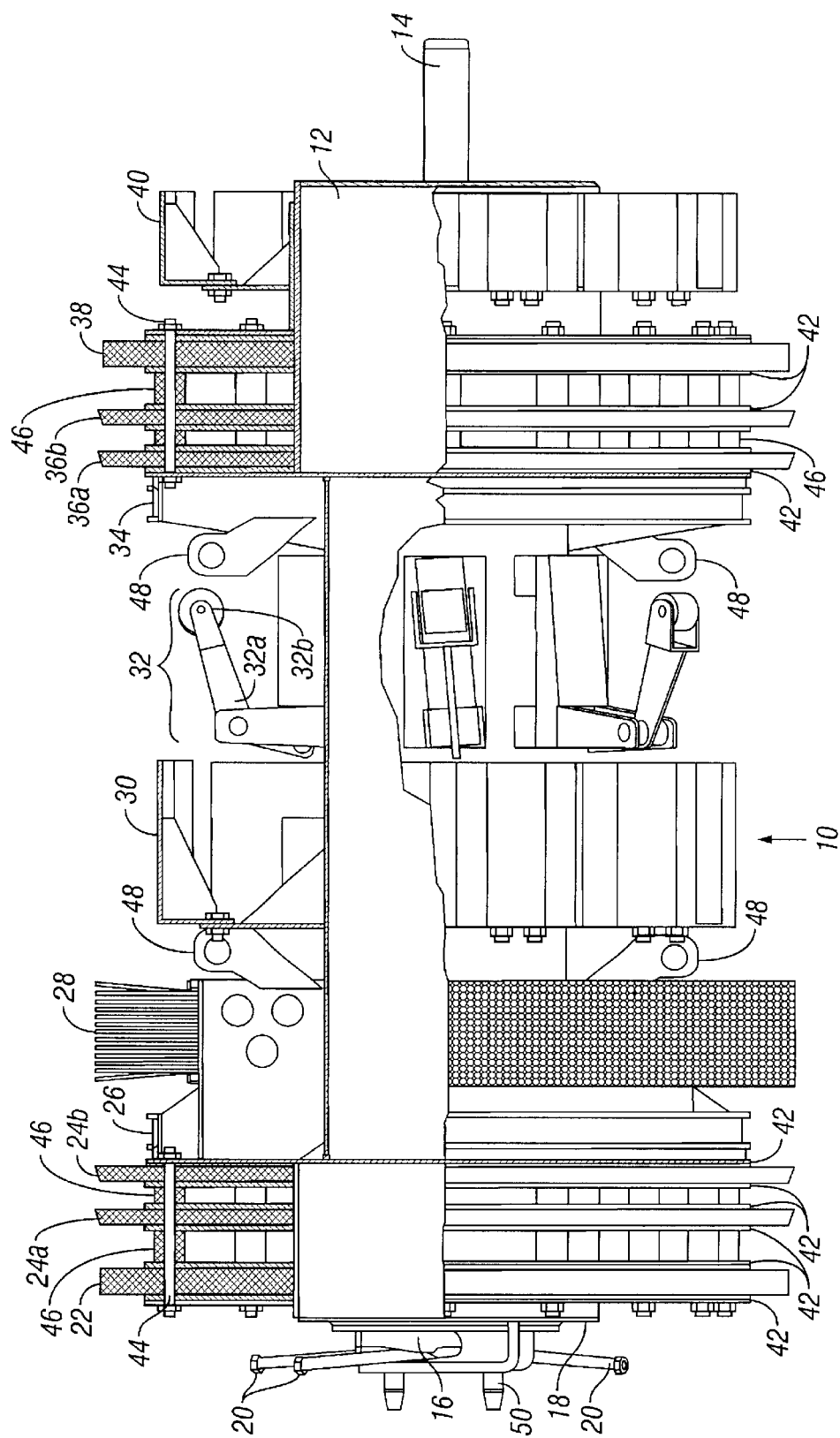

The present invention relates to the cleaning of the inside surfaces of pipelines used in the transportation of gaseous media, and more specifically to a device that decreases the cleaning time and improves the quality of the cleaning process.

2. Summary of the Prior Art

Currently, there are several procedures and devices for removing impurities from inside and on internal surfaces of pipelines used for transportation of gaseous media. The impurities may include, for example, pipeline system construction residuals such as welding electrodes, various metal objects, etc. In addition, some impurities, such as condensates and impurities from compressor stations arise as a consequence of the abrasive processes as the transported medium contacts the pipeline interior surface.

Devices used for pipeline cleaning are principally made as sliding mechanisms in the pipeline with the utilization of physical properties of the transported media affecting the corresponding mechanisms. They contain a carrying body where the cleaning elements are fixed. The structure and material of the elements corresponds to the cleaning method.

Among the most frequently used are collar type cleaning devices where collars are the crucial cleaning elements, and their circumferential surface fits snuggly within the internal surface of the pipeline. They are suitable for cleaning of pipelines from fluid impurities.

Cleaning devices including two cleaning elements, namely, a collar and a magnetic segment, are more common than the collar-only devices previously described. In these devices, the space between the exterior surface of the collar and the interior surface of the pipeline, which is approximately 100 up to 200 mm, partially restricts the cleaning efficiency of the device. The structure of these magnetic devices determines their ability to remove from the pipeline, in addition to fluid impurities, also metallic components of impurities. As a consequence of the fact prior art devices do not rotate during the cleaning, and are not equipped to break the bond between impurities and the pipeline surface, especially in the case of higher adherence of impurities to the internal wall of the pipeline, these prior art devices have low cleaning efficiency.

Cleaning devices equipped with collars and brushes with metal bristles are comparatively widespread. The utilization of brushes in the cleaning process on one side has favourable influence on the cleaning quality of the internal surface of the pipeline and, in fact, the equipment is able to clean the pipeline from all impurities but, consequently, this increases the load on the collar part of the equipment and therefore has negative influence on its wear.

Prior cleaning devices where the cleaning is accomplished with collars equipped with metal tips at the contact area with the pipeline wall are utilized mainly for the removal of thin impurities as, for example, wax from crude oil pipelines. In this case, it is a special cleaning device and this is accompanied by higher financial costs for its manufacture. Equally as in the case of the previous device, at higher levels of clogging of the pipeline, the collars are excessively loaded and therefore quickly worn down.

Recently, cleaning devices have been produced which, in addition to the previously mentioned cleaning elements, are equipped with a speed regulator for controlling the sliding motion of the cleaning device through the pipeline. The aim of this design is to optimize the speed of the device depending, for example, on the extent of the clogging or on the flow of the transporting medium to thereby achieve higher cleaning quality.

U.S. Pat. No. 4,027,349 discloses a cleaning device consisting of a body means adapted to be received in a pipe, relative means supported by said body means adapted for coaxial rotation in the pipe. A plurality of brushes circularly spaced around the outer periphery of the relative means are mounted for rotation about an axis directed toward the wall of the pipe. A gas motor means rotates each brush about the axis. The relative means has a flow passage means for delivering gas from a non-relative source carried by the body means to the gas motor means to operate the gas motor means. The axis of each brush is disposed at a small forward angle from a direction radial of the rotative means and with respect to the direction of rotation of the rotative means, whereby the leading edge of each brush applies less pressure against the pipe wall than the trailing edge of the brush, thereby reducing brush wear. The cleaning device also includes a means for biasing each brush against the pipe wall.

Pipeline cleaning devices may consist of one, two, and sometimes three parts connected by hinges. The two- and three-part hinged cleaning devices are suitable, above all, for negotiating smaller diameter pipelines. Simple cleaning devices are used for larger dimensioned pipelines. A common disadvantage of existing pipeline cleaning devices is that their cleaning motion is limited to sliding through the interior of the pipeline.

From among such tools we note the cleaning device described in European Patent No. EP 0 076 434 A1 which discloses a cleaning device having at least one working head fixable in a working position and being movable along defined feed paths through the interior of the pipelines or vessels which are not visible from the outside. Instruments mounted on the at least one working head include rotatable brushes mounted on the working head which apply pressure against the inner wall surfaces to be cleaned. At least one suction nozzle is mounted on the working head and is movable into alignment with a given brush engagement region of a pipeline or vessel. The cleaning device further comprises an injector having a suction side connected to the nozzle, a discharge side and a propulsion nozzle, a propellant line feeding the propulsion nozzle of the injector from outside the pipeline or vessel, and a dust collecting bag connected downstream of the discharge side of the injector.

DISCLOSURE OF INVENTION

The shortcomings described above are addressed by the present inventive cleaning device. The device includes cleaning elements that rotate about the longitudinal axis of the device and slide along the interior of the pipeline in a spiraling motion as the device proceeds through the pipeline. The device and the cleaning elements are propelled by the transported medium. The device comprises a carrying body with a shield at the front end of the carrying body. A transfer port at the back end of the carrying body leads to a speed regulator mounted on the shield for controlling the speed of the device. On the carrying body, particularly, on outside circumference walls, there are fixed individual parts of the device which can be removed and replaced. From these parts there are at least two carry and guide parts, at least one sealing and scraping part, one brush, a main magnet, and the revolving mechanism and guiding part. Each sealing and scraping part, carry and guide part, and brush part have circular cross-sectional profile. The outside circumference of the magnet follows the internal circumference of the pipeline, and between these two circumferences there is a gap. Each sealing and scraping part, carry and guide part, are made of flexible material, such as polyurethane and brush have a circular cross-sectional profile. The outside circumference of the magnet is less than the internal circumference of the pipeline, creating a gap. The sealing and scraping part and carrying and guiding parts are made of flexible material, such as a suitable polyurethane material. The placement of carrying and guiding parts stabilizes the device's motion with regard to its center of gravity. The parts are arranged in the following order from the shield of the device: carrying and guiding part, sealing and scraping part, brush, main magnet, revolving mechanism and the guide, and carrying and guiding part or the set of parts.

According to the invention, the cleaning mechanism will provide, as a practical matter, the removal of all kinds of impurities appearing in pipelines, either of metal origin, as for example impurities arising from the abrasive wearing, impurities which remained in the pipeline systems after their construction, especially welding electrodes and their residual parts, iron scales, or other impurities as, for example, condensates. The structure and mutual arrangement of individual parts of the device are based on the device's requirement to simultaneously slide and rotate to accomplish the cleaning function of the device. Regulation of the forward speed of the device, in combination with the revolution of the device around its longitudinal axis, will properly clean the internal space of the pipeline from metal particles while evenly distributing the caught particles around the outside circumference of the device.

Additionally, the cleaning motion of the present inventive cleaning device enables it to achieve a high standard of cleaning on the first pass through a pipeline system. Repeated cleanings with the device act as a check cleaning or a final cleaning depending on the level of clogging of the pipeline. The present inventive cleaning device achieves at least comparable quality pipeline system cleaning as the prior art devices, and in less time.

BRIEF DESCRIPTION OF DRAWINGS THE DRAWING

According to the invention the device for the internal walls cleaning is schematically outlined on the picture as the front view with the FIG. 1 is an elevation view of the present inventive cleaning device with a partial cross-section taken along the top of the device.

DETAILED DESCRIPTION OF THE DRAWING

FIG. 1 shows a preferred embodiment of the present inventive cleaning device. The structure and features of the device enable it simultaneously to remove metal, liquid and other impurities equally from around the entire interior circumference of the pipeline, as well as enabling the device to break any bond between the impurities and the internal pipeline surface.

Basically, the device 10 comprises a particle removing means, a speed regulating means for regulating the forward speed of the device, and a rotation means for rotating the device as it proceeds through the pipeline. In a first preferred embodiment, the device 10 comprises a carrying body 12 made of metal material and having a proximal end at the front of the carrying body and a distal end at the rear of the carrying body. The particle removing means comprises a combination of particle loosening means, such as scrapers and brushes, and particle collecting means, such as magnets. The scrapers are dimensioned for an interference fit with the interior surface of pipeline and create a seal between the cleaning device and pipeline. The particle collector means is dimensioned to fit into the pipeline and create a gap or collection space between the outer circumference of the collector means and the interior of the pipeline.

Around the longitudinal axis of the carrying body, there is the transfer port means 14 comprising a chamber extending from the proximal end to the distal end of the carrying body. The speed regulating means 16 is disposed on the shield 18 at the front of the device and communicates with the proximal end of the chamber. The speed regulating means 16 regulates the forward speed of the device 10 with a series of stream oriented, over-pressure dimensioned transfer nozzles 20 each comprising an adjustable aperture.

The outside surface of the carrying body 12 is variable in that certain parts are interchangeable. The variability is determined by the structure and the function of parts which are fixed on the external surface. The individual functional parts are arranged and fixed to the body on the outside circumference of the carrying body 12 using dismantling joints. Starting from the shield, 18 and moving front to back there are arranged as follows: a front carry and guide 22, a first and second front scraper 24 for removing the impurities, a first guiding and fixing collar 26, a front brush 28, a first collector means, comprising a first magnet 30, the rotation means 32, a second guiding and fixing collar 34, a first and second rear scraper 36, the back carry and the guide component 38, and a second magnet 40.

The front scrapers 24a, b and the front carry and guide 22, located on the side of the shield 18, are individually inserted between flanges 42, and are fixed to them by means of screws 44, while gaps between flanges are limited by distance elements 46. The flanges are fixed to the carrying body 12. From the weight viewpoint it is advantageous that the front scrapers 24a, b as well as front carry and guide 22 are made of composite reinforced polymer or other similar plastic material with similar properties. The front carry and guide 22 and the front scrapers 24a, b have a circular outer edge. The dimension of the outside diameter of the front scraper 24 enables their proper positioning with tight seating in the pipeline. The outside diameter of the front carry and guide 22 enables movable seating in the pipeline. From the structural viewpoint, it is advantageous to fix the front carry and guide 22 and the front scrapers 24a, b to flanges 42 by common screws 44.

It is preferred that the front brush 28 comprises a first and second section of bristles with different physical properties and distribution densities. The first section is placed closer to the shield 18 of the device and contains, when compared to the bristles of the second section, bristles which are thicker, stiffer and having a sparser distribution. The second section contains thinner bristles, that are more flexible, and having a denser distribution. From the viewpoint of the efficiency of this function it is suitable if its diameter is adjusted for the seating into the pipeline with interference, that is, with the ends of the brush bristles touching the inner surface of the pipeline.

The front magnet 30, by its outside circumference, follows the internal circumference of the pipeline while between these two circumferences a gap is created and the outside circumference or surface of the front magnet 30 has n sides. It is important that the front magnet and its placement, especially its distance from the front brush 28, secures its dominating attractive forces in the space of the front magnet 30 which provides for entrapping even those smallest ferromagnetic impurities from the inside wall of the pipeline.

Behind the front magnet 30 on the carrying body 12 there is fixed the rotation means 32. The rotation means 32 comprises spring-cushioned arms 32a equipped with small wheels 32b and arms that by their precisely dimensioned pressing forces interact with the pipeline. The arms are mounted to the carrying body 12 slightly off-axis enabling the device 10 to rotate as its moves through the pipeline. Behind the rotation means 32 there are various alternative combinations of the following components: the rear carry and guide 38, first and second rear scrapers 36a, b, a rear brush (not shown), and a rear magnet 40. It is advantageous to assemble these components in the following combinations:

Rear carry and guide 38, first and second rear scrapers 36a, b, back brush (not shown); or Rear magnet 40, rear carry and guide 38, rear brush (not shown), first and second rear scrapers 36a, b; or Rear magnet 40, first and second rear scrapers 36a, b, rear carry and guide 38; or Rear magnet 40, rear carry and guide 38, first and second rear scrapers 36a, b, rear magnet 40, rear brush (not shown); or At least a first rear scraper 36a, back carry and guide 38, and first and second rear scraper 36a, b.

From the viewpoint of the structure and the function it is advantageous if the rear carry and guide 38 and the first and second rear scrapers 36a are inserted between flanges 42 with gaps limited by spacers 46 and are drawn together by common screws 44. From the viewpoint of the adjustment of components for seating into the pipelines, the rear carry and guide 38, the rear scrapers 36a, b, and rear brush (not shown) have a circular circumference, while the rear carry and guide 38 is adjusted to achieve movable seating into the pipeline with an interference fit, and the first and second rear scrapers 36a, b are adjusted for seating into the pipeline with an interference fit.

The diameter of the back brush part corresponds to the inside diameter of the pipeline with an interference fit. From the material viewpoint it is advantageous if the front and rear carry and guide 22, 38, and the first and second front and rear scrapers 24a, b, 36a, b are made of polyurethane or another material with similar properties. The rear brush is constructed similar to the front brush 28. Additionally, the rear brush and rear magnet 40 function similarly to the front brush 28 and front magnet 30.

From the viewpoint of the motion of the device, it is designed in a way that it is balanced with the center of gravity of the device positioned for stabilized motion of the device.

The design of the front and rear carry and guide 22, 38, as well as the front and rear brushes, in segments is very advantageous. The device 10 also consists of additional elements intended to prevent damage to the device 10 during the manipulation and the transportation of the device, during repair and maintenance of the device, and while fixing the position of the device in the pipeline. For this purpose the device contains lifting eyes 48 fixed to the carrying body 12, and a bumper 50 mounted on the shield 18. Auxiliary parts can be utilized at the insertion and extraction of the device 10 into and from the signaling pipeline. In addition, the device is equipped with signaling equipment (not shown), for locating the position of the device in the pipeline, and instrumentation for measuring the rotational velocity of the device (not shown). These tools are placed in a protected space in the carrying body 12. The front and rear fixing and guiding collars 26, 34 are used for the manipulation with the device at the back side of the device and for its maintenance, and by means of them and some auxiliary equipment, for example supporting stands, it is possible to fix the device on site with the assistance of the rollers on the stands to turn the device.

The device 10 is inserted into the pipeline for operation and its motion is provided with the utilization of physical properties of the transported medium, for example, the gas pressure. The transfer port means 14 fills with the transported medium where a pressure develops. The interconnection of the transfer port 14 with the speed regulator 16 regulates the speed of the forward motion of the device by varying size of the apertures in the discharge nozzles 20. Pressure differences between sources of the pressure of the transported medium, for example, in the ease of gas between compressor stations, causes the device to move. Additionally, longitudinal holes in the transfer port means 14 extend through the carrying body to enable the transported medium to act upon the components mounted on the carrying body. For example, the gas pressure pushes the front scraper 24 in the direction of the flow of the gas with the utilization of axial holes.

The orientation of the discharge of the nozzles 20 and the size of the discharge is provided by the flow of the gas through nozzles 20 also breaks the adhesion of impurities to the walls of the pipeline. The released impurities are pushed in front of the device by the front carry and guide 22 and the front scraper 24. The transfer of these impurities occurs into the collection spaces, while, consequently, the impurities of metal character are collected from these spaces by means of the front brush 28 and the front magnet 30, and eventually the rear magnet 40.

The function of the front brush 28, and brushes generally, is to mechanically clean the internal surface of the pipeline and, simultaneously, agitate impurities into a position which enables the front or rear magnet 30, 40 to efficiently attract and catch the metal impurities and to transfer them into the final place of the cleaning.

The design of the brush 28 in two sections contributes significantly to the efficiency of this function of the device. The first section has thicker, less flexible and elastic bristles, and sparse distribution performs rough cleaning. The second section contains more flexible bristles, which are thinner and have higher distribution density, and provide final cleaning of the internal surface of the device and, simultaneously, breaks the adhesion of impurities to the internal surface of the pipeline, making it possible to efficiently employ the attractive forces of the front magnet 30, and eventually of the back magnet 40 and to entrain metal impurities and cause their adhesion to this magnet. From this viewpoint it is advantageous to place the front brush 28 into the magnetic field of the front magnet 30 and to place the back brush (not shown) into the magnetic field of the back magnet 40.

The function of the front magnet 28, and eventually of the rear magnet 40, is to attract metal impurities and to keep them in this position up to the termination of the cycle in the cleaning process. From this viewpoint the structure of elements providing magnetic cleaning takes into account the magnetic phenomena around the magnet, as for example magnetic induction, and properly eliminates negative influence of these phenomena on the cleaning process. A sufficiently large gap between the outside circumference of the magnets 28, 40 and the internal surface of the pipeline creates space where the large volume of impurities can be caught. The rotation means 32 creates the helical motion of the device 10. The advantage of this type of the motion is that, on one side, it provides balanced cleaning of the surface, for example by the front brush 28, and on the other side, it provides balanced wear of the parts of the device. Another advantage in the device's revolution is that there is a more balanced distribution of impurities caught on the surface of the main magnet 30 or the back magnet 40.

The function of the front and rear carry and guide 22, 38 to equally transfer the load from the weight of the device to the pipeline and, simultaneously, to provide smooth guiding of the device 10 as it travels through the pipeline. The rotations means 32 guides the device in the pipeline, as well as rotating it as it travels through the pipeline.

The function of combinations of components attached to the carrying body behind the front magnet further increases the cleaning efficiency of the device. The individual components of combinations previously disclosed fulfill the same functions as the corresponding components fixed to and arranged in front of the front magnet.

The inventive cleaning device is especially suitable for cleaning gas pipelines with larger diameters. However, with small adjustments, the cleaning device is also suitable for cleaning the interior of pipelines transporting other types of media, including, but not limited to, crude oil.

There has been described herein a pipeline cleaning device that avoids the shortcomings of the prior art. It will be apparent to those skilled in the art that modifications may be made without departing from the spirit and scope of the invention. Accordingly, it is not intended that the invention be limited except as may be necessary in view of the appended claims.

While the present invention is described above in connection with specific embodiments, the invention is intended to cover all alternatives, modifications or equivalents that may be included within its sphere or scope, as defined by the appended claims.

What is claimed is:

1. A device for cleaning the interior surface of a pipeline for transporting a medium, the device comprising:
   means for removing particles on the interior pipeline surface;
   means for regulating the forward speed of the cleaning device; and
   means for rotating the cleaning device as it travels through the pipeline.

2. The cleaning device of claim 1 further comprising a carrying body, wherein the means for removing particles comprises a first brush disposed on the outer circumference of the carrying body.

3. The cleaning device of claim 2 wherein the first brush is hingedly attached to the carrying body.

4. The cleaning device of claim 1 further comprising a carrying body, wherein the means for removing particles comprises a first scraper disposed on the outer circumference of the carrying body.

5. The cleaning device of claim 4 wherein the first scraper is hingedly attached to the carrying body.

6. The cleaning device of claim 1 wherein the means for removing particles comprises a first brush and a first scraper.

7. The cleaning device of claim 6 further comprising a carrying body, wherein the first brush and first scraper are hingedly attached to the carrying body.

8. The cleaning device of claim 6 wherein the first brush and first scraper are interchangeably attached to the carrying body.

9. The cleaning device of claim 1 wherein the means for removing particles comprises a first and second brush and a first and second scraper.

10. The cleaning device of claim 9 further comprising a carrying body, wherein the first and second brush and first and second scraper are hingedly attached to the carrying body.

11. The cleaning device of claim 9 further comprising a carrying body, wherein the first and second brush and first and second scraper are interchangeably attached to the carrying body.

12. The cleaning device of claim 1 wherein the means for regulating the forward speed of the cleaning device comprises a nozzle having an adjustable aperture for regulating the passage of the transported medium through the cleaning device, thereby controlling the forward speed of the cleaning device.

13. The cleaning device of claim 1 further comprising a carrying body, wherein the means for rotating the cleaning device comprises a first off-axis wheel disposed on the carrying body.

14. The cleaning device of claim 1 further comprising a carrying body and a particle collecting means comprising a first magnet disposed on the carrying body for attracting metallic particles loosened by the means for removing particles.

15. The cleaning device of claim 14 herein the first magnet is positioned distally to the means for removing particles.

16. The cleaning device of claim 1 further comprising a carrying body and a central port comprising a channel extending from a rear surface of the carrying body through the carrying body to the means for regulating the forward speed of the cleaning device.

17. A device for cleaning the interior surface of a pipeline for transporting a medium comprising:
   a carrying body adapted to be received in the inside of a pipeline;
   a first scraper and a first brush disposed on the carrying body, the first scraper and first brush configured to loosen particles on the interior pipeline surface;
   a first magnet disposed on the carrying body distal to the first scraper and first brush, the first magnet being configured to collect particles loosened by the first scraper and first brush;
   a central port in the carrying body configures to enable the transported medium to pass through the cleaning device;
   a speed regulator disposed on the carrying body at a first end of the central port responsive to the transported medium and configured to regulate the forward speed of the cleaning device by regulating the passage of the transported medium through the cleaning device;
   a rotator disposed on the carrying body and responsive to the forward movement of the cleaning device for rotating the cleaning device as it travels through the pipeline.

18. The cleaning device of claim 17 wherein the first brush and first caper hingedly attached to the carrying body.

* * * * *